United States Patent
Haupt

(10) Patent No.: US 7,942,231 B2
(45) Date of Patent: May 17, 2011

(54) HYDRAULIC POWER STEERING SYSTEM

(75) Inventor: Jens Haupt, Oberursel (DE)

(73) Assignee: Nexteer (Beijing) Technology Co., Ltd.

( * ) Notice: Subject to any disclaimer, the term of this patent is extended or adjusted under 35 U.S.C. 154(b) by 0 days.

(21) Appl. No.: 12/470,300

(22) Filed: May 21, 2009

(65) Prior Publication Data

US 2009/0288906 A1 Nov. 26, 2009

(30) Foreign Application Priority Data

May 21, 2008 (EP) .................................. 08009402

(51) Int. Cl.
*B62D 5/00* (2006.01)
(52) U.S. Cl. ........................................ 180/442; 180/417
(58) Field of Classification Search .................. 180/417, 180/442
See application file for complete search history.

(56) References Cited

U.S. PATENT DOCUMENTS

| | | | |
|---|---|---|---|
| 4,079,805 A * | 3/1978 | Rau ................................ | 180/421 |
| 4,566,477 A * | 1/1986 | Barker et al. ................... | 137/101 |
| 4,570,667 A * | 2/1986 | Masica et al. ............... | 137/115.1 |
| 4,947,951 A * | 8/1990 | Miller ............................ | 180/423 |
| 5,791,141 A | 8/1998 | Phillips | |
| 6,931,981 B2 * | 8/2005 | Urbach ............................ | 91/459 |
| 2006/0225944 A1* | 10/2006 | Abner et al. ................... | 180/417 |
| 2007/0137923 A1* | 6/2007 | Dennis ........................... | 180/417 |
| 2008/0135325 A1* | 6/2008 | Stuhldreher et al. .......... | 180/442 |
| 2008/0202842 A1* | 8/2008 | Shevket ......................... | 180/442 |
| 2009/0173565 A1* | 7/2009 | Dennis ........................... | 180/417 |

FOREIGN PATENT DOCUMENTS

DE 10351089 5/2005

OTHER PUBLICATIONS

Search Report from European Patent Application No. 08009402.2.

* cited by examiner

*Primary Examiner* — Joanne Silbermann
*Assistant Examiner* — Tashiana Adams
(74) *Attorney, Agent, or Firm* — Cantor Colburn LLP

(57) ABSTRACT

A hydraulic auxiliary power steering for motor vehicles having a source for a hydraulic medium, in particular an oil pump, which can be driven during operation by a drive device, in particular by an internal combustion engine of the vehicle or by an electric motor, having a steering transmission and having a line system for the hydraulic medium connecting the source to the steering transmission, wherein the line system has at least two line sections through which the hydraulic medium can flow.

9 Claims, 3 Drawing Sheets

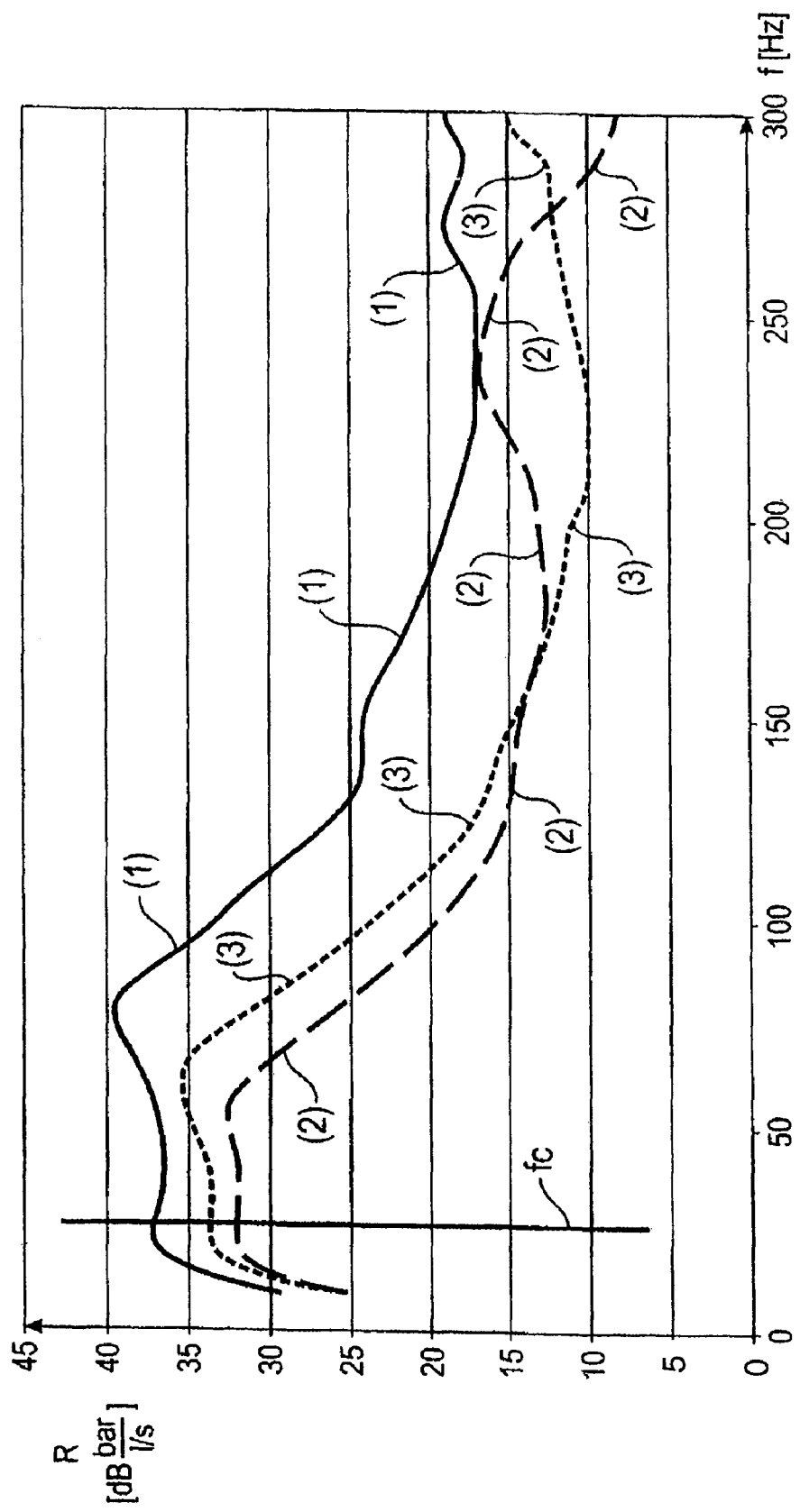

HYDRAULIC POWER STEERING SYSTEM

CROSS REFERENCE TO RELATED APPLICATION

This application claims priority to and all benefit of European Application No. 08009402.2 filed May 21, 2008, the complete disclosure of which is expressly incorporated by reference.

BACKGROUND OF THE INVENTION

1. Field of the Invention

The invention relates to a hydraulic power steering system for motor vehicles having a source for a hydraulic medium, in particular an oil pump, which can be driven during operation by a drive device, in particular by an internal combustion engine of the vehicle or by an electric motor, having a steering transmission or steering gear assembly, and having a line system for the hydraulic medium connecting the source to the steering transmission.

2. Description of the Prior Art

With known power steering systems of this kind, the line system connecting the oil pump to the steering transmission simply comprises a rubber hose. The length of this hose depends on the respective vehicle circumstances and in particular on the specific arrangement of the individual components e.g. in the engine space of the vehicle. Typical hose lengths are, for example, in the region of 50 cm, with shorter or longer connection hoses, however, also being able to be used in dependence on the respective circumstances.

It is problematic with such systems that speed fluctuations, e.g. of the internal combustion engine or of the electric motor, have an effect on the oil pump integrated in the drivetrain of the vehicle such that the conveying performance of the oil pump varies accordingly in time, which also has the consequence of fluctuations called rotary oscillations in the oil flow from the oil pump to the steering transmission or in the oil pressure prevailing in this hydraulic system. These fluctuations are felt by the driver as vibrations on the steering wheel and are perceived as irritating. These flow variations or pressure variations in the hydraulic medium which are ultimately induced by the drive device are also called "ripples" or "speed ripples." The drive device is also simply called a "motor" in the following. This in particular includes—but is not exclusive—an internal combustion engine provided for the propulsion drive of the vehicle or the electric motor of an electric hydraulic power steering (EHPS) system in which the motor drives the oil pump.

The problems of these vibrations perceptible at the steering wheel are currently increasing in relevance since an attempt is being made in particular in conjunction with diesel engines to keep the idling speed as low as possible. The fluctuations in the oil flow or oil pressure resulting in the irritating steering wheel vibrations are the more pronounced, the lower the speed of the motor driving the oil pump is.

An attempt can generally be made to combat these irritating steering wheel vibrations using improved interfaces, such as of the motor bearings, of the belt pulley, etc., of the motor and/or using an improved motor management. However, these possibilities are limited since such approaches are, on the one hand, associated with a relatively high effort and/or cost and, on the other hand, mutually opposed interests of the individual system suppliers have to be taken into account in the manufacture of motor vehicles. For example, the manufacturer supplying the steering system, including the hydraulic power steering system, thus usually has little influence on measures in the area of the motor.

An attempt has also already been made simply to extend the connection hose between the oil pump and the steering transmission, i.e., to provide a hose length which is larger than is actually necessary for the connection of the oil pump to the steering transmission. The irritating steering wheel vibrations can actually be minimized in a satisfactory manner or eliminated using such an additional hose length.

However, such a hose extension results in other disadvantages which are not acceptable in practice.

The connection hoses can expand due to their elasticity. The oil pressure fluctuations in the connection hose caused by the motor therefore result in corresponding hose expansion phenomena. Since these hose expansion phenomena change the flow cross-section of the hose, the result is time delays in the transfer of the oil pressure from the oil pump to the steering transmission. These delays become noticeable on steering in that a turn of the steering wheel made by the driver results in a noticeable steering torque increase. Such steering torque increases are not acceptable either with respect to driving safety or to driving comfort.

Furthermore, larger hose lengths result in problems in the so-called "packaging," i.e. in the accommodation of the steering system and in particular of the connection hose in the motor space where increasingly less space is available so that all system suppliers are encouraged to restrict the space requirements of their components to a minimum. Larger hose lengths can therefore ultimately not be implemented in practice for this purpose.

SUMMARY OF THE INVENTION AND ADVANTAGES

It is the object of the invention to improve hydraulic power steering systems of the initially named kind such that irritating steering wheel vibrations due to the influence of the drive devices are suppressed as much as possible, with the aforesaid disadvantages simultaneously being avoided.

This object is satisfied by a hydraulic auxiliary power steering for motor vehicles, having a source for a hydraulic medium, in particular an oil pump, which can be driven during operation by a drive device, in particular by an internal combustion engine of the vehicle or by an electric motor, having a steering transmission and having a line system for the hydraulic medium connecting the source to the steering transmission, wherein the line system has at least two line sections through which the hydraulic medium can flow.

Provision is made in accordance with the invention for the line system connecting the source for the hydraulic medium to the steering transmission to have at least two line sections connected in parallel through which the hydraulic medium can flow, and/or for that at least one of the line sections being manufactured at least partly from a material, in particular rubber, which permits changes in the flow cross-section of the line section on pressure fluctuations occurring during operation.

It has surprisingly been found that a significant reduction in the steering wheel vibrations can be achieved if at least two line sections are provided between the source, which is in particular formed as an oil pump or oil pressure pump, and the steering transmission, with the hydraulic medium flowing through them during operation. At least two line sections should naturally not be understood in the sense of the invention as exclusively two or more line sections which are simply "connected in series" sequentially in the flow direction and which together form a single connection line between the source and the steering transmission. A single connection line between the source and the steering transmission such as is used with known power steering systems is therefore not a subject of the invention.

In accordance with the invention, the at least two line sections which are flowed through by the hydraulic medium in operation are in particular arranged in parallel. In this connection, "parallel" is not to be understood, or is at least not exclusively to be understood, in a geometrical sense, i.e. it is admittedly possible, but not compulsory, that the two line sections have a spatially parallel extent over some of their length or over their total length. It is rather the case that a "parallel connection" of the line section in the sense of a parallel connection of electrical components of an electrical circuit is meant herewith, i.e. at least two paths are available to the hydraulic medium via which the hydraulic medium can move from the source to the steering transmission. The at least two line sections which can be flowed through are therefore in particular not blind pieces or dead-end pieces which could admittedly be filled with hydraulic medium, but through which the hydraulic medium cannot flow, i.e. in which hydraulic medium can stand, but cannot flow.

Simulations and trials have shown that the extent of the steering wheel vibration suppression by the line system in accordance with the invention is inter alia also dependent on how the line system is specifically designed. The number of line sections, the length and the flow cross-section of the individual line sections as well as the number and the arrangement of any existing branches or openings of the line sections among one another in particular play a role. The respective vehicle circumstances are to be taken into account in the design of the specific line systems. In practice, the line system adapted to a respective vehicle will therefore frequently or mostly represent a compromise between practical realizability, on the one hand, and theoretically maximum achievable steering wheel suppression, on the other hand.

Accordingly, within the framework of the invention, any desired different configurations of the line system are generally conceivable. Some basic aspects are set forth in the independent claims, in the description and in the drawing.

Provision can thus e.g. be made that each line section or at least a plurality of line sections each start from the source and open into the steering transmission. A parallel extent is thus realized in this manner for the respective line sections over the total path between the source and the steering transmission.

Provision can furthermore be made in a configuration having two line sections, for example, that a second line section branches off from a first line section. It is therefore not absolutely necessary that each line section extends over the total path, i.e. extends from the source up to the steering transmission. Provision can alternatively or additionally made that a second line section opens into a first line section.

It is furthermore not necessary that one or more line sections are directly connected at all to the source or to the steering transmission. In other words, it is possible in accordance with the invention that at least one line section both branches from one of the other line sections and opens into one of the other line sections. For the case, for example, that two line sections are provided, the branching and the opening of the second line section are located at mutually spaced apart positions of the first line section.

It is generally possible in accordance with the invention that the line system includes a net or a network of a plurality of line sections, with a plurality of positions being present at which a respective line section starts from one of the other line sections or a line section opens into one of the other line sections.

In accordance with the invention, line sections can be provided, with each line section branching off from a line section "a" of the other line sections and opening into a line section "b" of the other line sections. In this respect, a=b or a≠b can apply.

Provision can furthermore be made in accordance with the invention that a plurality of other line sections start from at least one line section. Provision can alternatively or additionally be made that a plurality of other line sections open into at least one line section.

All line sections can have the same flow cross-section. This is, however, not compulsory. It is also possible that the line sections have different flow cross-sections.

At least one line section, preferably every line section, preferably includes a flexible or ductile hose. The line sections are preferably each made at least partly from a material, in particular from rubber, which permits changes in the flow cross-section of the line sections on pressure fluctuations occurring during operation.

In a further advantageous aspect of the invention, the line system can have a plurality of segments which are arranged sequentially in the flow direction of the hydraulic medium and which in particular differ from one another with respect to their noise damping behavior. At least one segment can in particular be formed by one or more flexible or ductile hose sections, whereas at least one further segment is formed by one or more rigid or stiff tube sections. These segments are in particular matched to one another in the sense of noise optimization with respect to their lengths and/or their positions. A significant improvement can hereby be achieved in noise damping if the hose segments and tube segments are arranged sequentially, that is so-to-say are "connected in series" in a manner dependent on the respective circumstances.

In accordance with a further embodiment of the invention, the line system additionally has at least one tuning device which serves for the noise optimization and which is arranged inside a section of the line system in particular made as a hose. Such tuning devices are also called "tuners." They are arranged within one or more hose sections of the line system and in particular serve to refine the behavior of the total system with respect to the noise damping properties.

The invention moreover relates to a motor vehicle having a hydraulic power steering system of the kind set forth here.

Further preferred embodiments of the invention are set forth in the dependent claims, in the description and in the drawings.

BRIEF DESCRIPTION OF THE DRAWINGS

The invention will be described in the following by way of example with reference to the drawings. There are shown:

FIG. 3 is a diagram with results of investigations relating to the mode of action of different line systems used in a power steering system.

Figure 1:
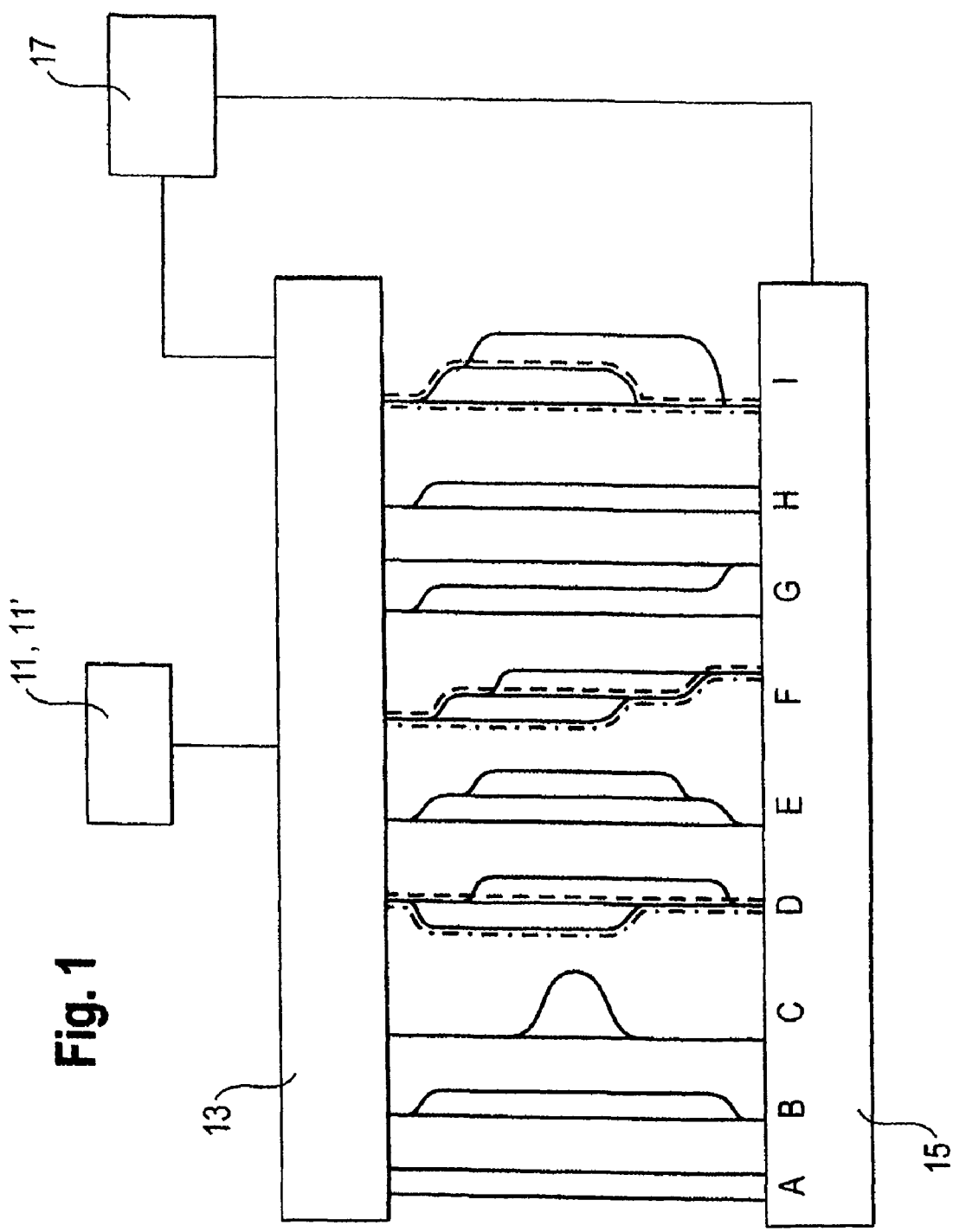
FIG. 1 is schematically, in a single representation, a plurality of different possible embodiments of a hydraulic power steering system in accordance with the invention.

While the invention is susceptible to various modifications and alternative forms, specific embodiments thereof are shown by way of example in the drawings and may herein be described in detail. It should be understood, however, that the drawings and detailed description are not intended to limit the invention to the particular forms disclosed, but on the contrary, the intention is to cover all modifications, equivalents and alternatives falling within the spirit and scope of the present invention as defined by the appended claims.

DETAILED DESCRIPTION OF THE INVENTION

FIG. 1 shows purely schematically the design of a hydraulic power steering system. An internal combustion engine 11 provided primarily for the propulsion drive of a motor vehicle moreover drives an oil pump 13 serving as a source for a hydraulic medium, i.e. the oil pump 13 is integrated into the drivetrain of the vehicle. It can alternatively also be an EHPS system in which the oil pump 13 is driven by an electric motor 11'. The critical frequencies with an EHPS system are displaced with respect to those of a system with an internal combustion engine as the drive for the oil pump, but are still in a range which can undergo a significant noise damping by the invention.

The oil pump 13 is in communication with a steering transmission 15 via a line system A-I, with different possible embodiments A-I being shown here simultaneously for the line system. A reservoir 17 into which the hydraulic oil backflow from the steering transmission opens is furthermore provided for the hydraulic oil.

The basic function of a hydraulic auxiliary power steering is generally known, so this will not be looked at in any more detail. On a turn of the steering wheel leaving the neutral position, hydraulic oil provided by the source 13 flows via the line system A-I in the intended manner through the steering transmission 15 to support the driver in steering.

The line systems A-I shown in FIG. 1 show purely by way of example different possibilities for a specific embodiment of the line system. In each case only a single one of these line systems A-I is naturally present in a specific application between the oil pump 13 and the steering transmission 15.

The line system A includes two line sections which are connected in parallel, which start in each case from the oil pump 13 and open into the steering transmission 15.

In contrast to this, provision is made in the line system B that only one line section starts from the source 13 and opens into the steering transmission 15. The other line section branches off the first line section relatively closely to the oil pump 13 and opens into the first line section relatively closely to the steering transmission 15. The distance over which two parallel paths are available for the medium can generally have any desired length and can be arranged at any generally desired position in the line system between the oil pump 13 and the steering transmission 15. This second flow path for the hydraulic oil providing the branching and opening line section is in this embodiment only slightly shorter than the flow path provided by the first line section extending over the total distance between the oil pump 13 and the steering transmission 15.

The line system C basically corresponds to the line system B; however, with the positions of the branching and of the opening of the second line system being located at a smaller spacing from one another. The length of the second line section can generally be selected as desired and is independent of the distance between the branching from and the opening into the first line section along the first line section. In the line system C, it is indicated by the extent of the second line section that it by no means has to extend over its total length or also only over a part section of its length in direct proximity to the first line section. Depending on the respective vehicle circumstances, the two line sections can generally be laid as desired in the motor vehicle or in its motor space, provided that the configuration of the line system formed by the two line sections permits. In particular no parallel extent—neither sectionally nor continuously—of the two line sections is required in the geometrical sense.

The line system D shows an example with three line sections. Two further line sections branch from a continuous line section directly connecting the oil pump 13 to the steering transmission 15 at positions mutually spaced apart in the flow direction and in turn open into the continuous line section at mutually spaced apart positions. The lengths and the absolute and relative locations of the branching positions and/or opening positions can generally be varied as desired in such a line system.

It must generally be noted, with this generally applying to all line systems in question, that the designation of one of the line sections, for example in line system D, as a "continuous" line section connecting the oil source 13 "directly" to the steering transmission 15 is arbitrary in a certain manner. The figurative representation of such a line system may not disguise the fact that in practice a system which is the same with respect to the branching positions and opening positions can have a different appearance due to the manner of laying in the motor vehicle due to the circumstances. Against this background—depending on the manner of observation—in the line system D, both the flow path additionally drawn in dashed lines and the flow path additionally drawn in chain dotted lines could each be called a "continuous" line section in the above sense.

In a different representation or manner of laying, the line system I would result which is the same with respect to the general selection of the branching positions and opening positions and in which in turn the corresponding sections are additionally shown in dashed or chain dotted lines.

In the line system E, three line sections are in turn provided.

The line system F is in turn equivalent to the line systems D and I with respect to the location of the branching positions and opening positions. The corresponding line sections are here in turn drawn in dashed or chain dotted lines.

Whereas in the line systems B-F and I in each case only a single line section starts from the oil pump 13 and opens into the steering transmission 15, provision is made in the line system G in accordance with the line system A that a respective two line sections start from the oil pump 13 and open into the steering transmission 15. Additionally here, a third line section is provided which connects these two continuous line sections, which starts from the one line section relatively closely to the oil pump 13 and which opens into the other line section comparatively closely to the steering transmission 15. The length of these connecting line sections and also the position of the branching position and/or opening position can generally be varied as desired.

The line system H is characterized inter alia in that the number of the line sections starting from the oil pump 13 is not identical to the number of the sections opening into the steering transmission 15. A reliable operation of this line system H can be ensured—if the same flow cross-section is not possible for all line sections—by the selection of corresponding flow cross-sections.

Figure 2:
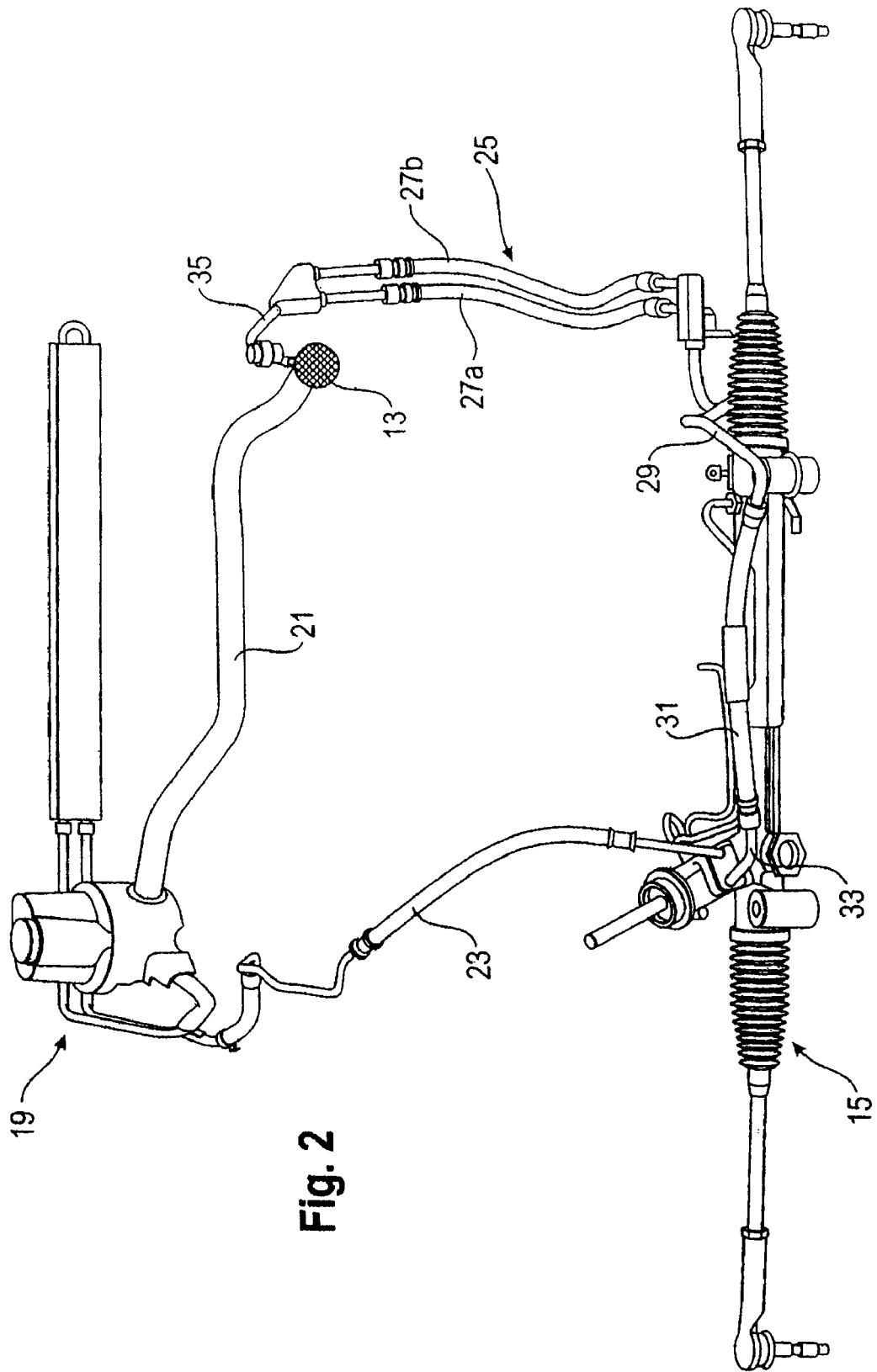
FIG. 2 is an example of a hydraulic steering system in accordance with the invention.

FIG. 2 shows the arrangement of an embodiment of a line system in accordance with the invention in a hydraulic steering system which includes an oil pump 13, an oil container 19, a suction hose 21 and a return hose 23 in addition to the steering transmission 15.

The line system in accordance with the invention consists of a plurality of segments, and indeed a tube section 35 which is connected to the oil pump 13 and which is initially adjoined by a pressure hose 25 which will be looked at in more detail in the following. The pressure hose 25 merges into a further tube section 29 which is in turn adjoined by a hose section 31 which merges into a further tube section 33 which is finally connected to the steering transmission 15.

Whereas the last-mentioned hose section 31 includes a single hose line, the pressure hose 25 is made in a manner in accordance with the invention such that two parallel line sections 27a, 27b are provided which are each made as a hose. The hoses 27a, 27b are each connected via connection sections or transition sections which can generally be made as desired, in particular made of metal, e.g. in the form of crimp sleeves, to the respective preceding and subsequent common line sections. The two line sections 27a, 27b are here made identical in particular with respect to length, material and flow cross-section, with alternative aspects, however, also being possible in this respect. Alternatively or additionally, the hose section 31 disposed closer to the steering transmission 15 can include in the manner in accordance with the invention two or more parallel line sections which each include a hose.

The graphical representation of FIG. 3 shows the operation of different line systems. A measure R is entered for the vibrations (ripples) perceptible at the steering wheel by the user over the frequency of these steering wheel vibrations, with the unit db bar/(liter l/second s).

What is decisive for the acceptance of a hydraulic power steering system with respect to vibrations perceptible at the steering wheel is the degree of the vibrations at a critical frequency fc of approximately 30 Hz which is shown as a perpendicular bar in FIG. 3.

Within the framework of the comparison made here, a known line system has the worst results whose behavior is shown by the solid curve (1) and which is used in a specific configuration in a specific motor vehicle. The internal combustion engine of the vehicle is a diesel engine.

The dashed curve (2) represents a theoretical design of a line system in accordance with the invention having at least two line sections which can be flowed through, with the lengths of the two line sections having been selected to investigate within the framework of a simulation the degree to which the vibrations can be reduced without influencing the driving dynamics.

The dotted curve (3), in contrast, represents a specific line system in accordance with the invention realizable in practice which is adapted to the circumstances of a specific vehicle and can in particular be laid in this vehicle without problem, that is, there is no "packaging" problem. FIG. 3 shows that even with what has to be called a "compromise"—seen in comparison with the "ideal" dashed curve (2)—a significant improvement can be achieved with respect to the prior art in accordance with the solid curve (1), with this improvement being present over the whole relevant frequency range. This has the further advantage that the invention also proves to be advantageous in a further critical frequency range around approximately 90 Hz. These vibrations, which can be heard by the driver and are therefore likewise considered as non-acceptable, are due to instability of the total hydraulic system. It must finally be mentioned that pump noises in the range from 100 to 300 Hz can also advantageously be damped by the invention.

While the invention has been described with reference to exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

What is claimed is:

1. A hydraulic power steering system for motor vehicles, comprising:
    a source for a hydraulic medium which can be driven during operation by a drive device;
    a steering transmission and having a line system for the hydraulic medium connecting the source to the steering transmission;
    the line system having first, second, and third line sections, the first line section extending from the source to the steering transmission, the second line section being fluidly coupled between a first position and a second position of the first line section, the third line section being fluidly coupled between a third position and a fourth position of the first line section, the third position being between the first and second positions, and the fourth position being between the second position and the steering transmission.

2. A hydraulic power steering system in accordance with claim 1, wherein the first and second line sections have different flow cross-sections.

3. A hydraulic power steering system in accordance with claim 1, wherein the first and second line sections each include a flexible or ductile hose.

4. A hydraulic power steering system in accordance with claim 3, wherein the first and second line sections are each manufactured at least partly from a material which permits changes in the flow cross-section of the line section on pressure fluctuations occurring during operation.

5. A hydraulic power steering system in accordance with claim 1, wherein the line system additionally has at least one tuner serving for the noise optimization which is arranged within a section of the line system in particular made as a hose.

6. A hydraulic power steering system in accordance with claim 1, wherein the drive device is one of an internal combustion engine and an electric motor.

7. A motor vehicle having a hydraulic power steering system in accordance with claim 1.

8. A hydraulic power steering system for motor vehicles, comprising:
    a source for a hydraulic medium which can be driven during operation by a drive device; and
    a steering transmission and having a line system for the hydraulic medium connecting the source to the steering transmission;
    the line system having first, second and third line sections, the first line section extending from the source to the steering transmission, the second line section extending from the source to the steering transmission, and the third line section fluidly coupled between the first and second line sections.

9. A hydraulic power steering system for motor vehicles, comprising:
    a source for a hydraulic medium which can be driven during operation by a drive device; and
    a steering transmission and having a line system for the hydraulic medium connecting the source to the steering transmission; and
    the line system having first, second and third line sections, the first line section extending from the source to the steering transmission, the second line section being fluidly coupled between a first position and a second position of the first line section, the third line section being fluidly coupled between a third position on the second line section, and either a fourth position of the second line section or a fifth position of the first line section, the fifth position being between the second position and the steering transmission.

* * * * *